(12) United States Patent
Wu

(10) Patent No.: US 11,074,425 B2
(45) Date of Patent: Jul. 27, 2021

(54) DOI SCANNING-BASED INFORMATION PROCESSING

(71) Applicant: Advanced New Technologies Co., Ltd., George Town (KY)

(72) Inventor: Yuanpiao Wu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/886,450

(22) Filed: May 28, 2020

(65) Prior Publication Data
US 2020/0293735 A1   Sep. 17, 2020

Related U.S. Application Data

(63) Continuation of application No. PCT/CN2019/070809, filed on Jan. 8, 2019.

(30) Foreign Application Priority Data

Jan. 16, 2018   (CN) .......................... 201810039794.0

(51) Int. Cl.
*G06K 7/14* (2006.01)
*G06F 12/0875* (2016.01)
*G06K 7/10* (2006.01)

(52) U.S. Cl.
CPC ....... *G06K 7/1417* (2013.01); *G06F 12/0875* (2013.01); *G06K 7/10722* (2013.01); *G06F 2212/1041* (2013.01)

(58) Field of Classification Search
None
See application file for complete search history.

(56) References Cited

U.S. PATENT DOCUMENTS 5,862,326 A * 1/1999 Bapat ..................... H04L 29/06
                                                            709/203
9,047,586 B2   6/2015  Melick et al.
(Continued)

FOREIGN PATENT DOCUMENTS

CN         103235837        3/2016
CN         107016420        8/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mohamed Ibrahim
(74) *Attorney, Agent, or Firm* — Fish & Richardson P.C.

(57) ABSTRACT

Implementations of the present specification disclose DOI scanning-based information processing methods, apparatuses, and devices. After an end-user device scans a DOI and obtains service information corresponding to the DOI, the end-user device can cache the service information. Thereafter, the end-user device can read the cached service information, to generate a service request and send the service request to a service server. Particularly, when a network connection between the end-user device and the service server is abnormal, the end-user device can independently retry the service request based on the cached service information.

13 Claims, 4 Drawing Sheets

(56) References Cited

U.S. PATENT DOCUMENTS

| | | | | |
|---|---|---|---|---|
| 2012/0130888 A1* | 5/2012 | Cooke | ............... | G06Q 20/3272 |
| | | | | 705/39 |
| 2012/0193425 A1* | 8/2012 | Melick | ................. | G06Q 20/208 |
| | | | | 235/462.1 |
| 2013/0159517 A1* | 6/2013 | Kumarjiguda | ...... | H04L 67/2809 |
| | | | | 709/224 |
| 2016/0373556 A1* | 12/2016 | Xu | ....................... | G06K 7/1447 |
| 2017/0140190 A1* | 5/2017 | Xu | .......................... | G06F 16/44 |

FOREIGN PATENT DOCUMENTS

| | | |
|---|---|---|
| CN | 108304899 | 7/2018 |
| TW | 200424948 | 11/2004 |
| WO | WO 2017053326 | 3/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/070809, dated Apr. 12, 2019, 13 pages (with English translation).

PCT International Preliminary Report on Patentability in International Application No. PCT/CN2019/070809, dated Jul. 21, 2020, 9 pages (with English translation).

\* cited by examiner

DOI SCANNING-BASED INFORMATION PROCESSING

CROSS-REFERENCE TO RELATED APPLICATIONS

This application is a continuation of PCT Application No. PCT/CN2019/070809, filed on Jan. 8, 2019, which claims priority to Chinese Patent Application No. 201810039794.0, filed on Jan. 16, 2018, and each application is hereby incorporated by reference in its entirety.

TECHNICAL FIELD

The present application relates to the field of computer technologies, and in particular, to DOI scanning-based information processing methods, apparatuses, and devices.

BACKGROUND

With development and popularization of information technologies, digital object identifiers (DOI) such as a two-dimensional code and a one-dimensional barcode are widely applied.

In an existing scanning scenario, a user can scan a DOI (for example, a two-dimensional code) by using an end-user device. The end-user device processes the scanned two-dimensional code to obtain content (for example, an address of a service server and merchant information) in the two-dimensional code, and the end-user device can send a service request to the service server based on the content, and receive a service result fed back by the service server.

In the previous process, if a network connection between the end-user device and the service server is abnormal, a response timeout may occur, and the previous process needs to be repeatedly performed in this case.

SUMMARY

Implementations of the present specification provide DOI scanning-based information processing methods, apparatuses, and devices, to alleviate a problem that a user needs to repeatedly perform a scanning operation in some service scenarios.

The following technical solutions are used in the implementations of the present specification.

Implementations of the present specification provide a DOI scanning-based information processing method, including: scanning a DOI, and obtaining service information included in the DOI; caching the service information; and generating or retrying generating a service request based on the cached service information, and sending the service request to a service server.

Correspondingly, the implementations of the present specification further provide a DOI scanning-based information processing apparatus, including: an acquisition module, configured to scan a DOI, and obtain service information included in the DOI; a cache module, configured to cache the service information; and a retry processing module, configured to generate or retry generating a service request based on the cached service information, and send the service request to a service server.

Correspondingly, the implementations of the present specification further provide a DOI scanning-based information processing device, including a processor and a memory, where the memory is configured to store a DOI scanning-based information processing program; and the processor is configured to invoke the DOI scanning-based information processing program stored in the memory, and perform the following operations: scanning a DOI, and obtaining service information included in the DOI; caching the service information; and generating or retrying generating a service request based on the cached service information, and sending the service request to a service server.

The at least one technical solution used in the implementations of the present specification can achieve the following beneficial effects:

After an end-user device scans a DOI and obtains service information corresponding to the DOI, the end-user device can cache the service information. Thereafter, the end-user device can read the cached service information, to generate a service request and send the service request to a service server. Particularly, when a network connection between the end-user device and the service server is abnormal, the end-user device can independently retry the service request based on the cached service information. As such, repeated scanning performed by a user by holding the end-user device can be reduced or even alleviated.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and constitute no limitation on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and the corresponding accompanying drawings of the present application. Clearly, the described implementations are merely some but not all of the implementations of the present application. All other implementations obtained by a person of ordinary skill in the art based on the implementations of the present application without creative efforts shall fall within the protection scope of the present application.

In one or more implementations of the present specification, a DOI scanning-based information processing method is provided. An end-user device can cache information obtained by decoding a DOI, so that a process of scanning and decoding the DOI by the end-user device is decoupled from a process of sending a service request to a service server. As such, repeated execution of a scanning operation by a user can be reduced or even alleviated, thereby improving user experience.

The DOI in the implementations of the present specification can be mainly considered as a visualized encoded graphical identifier, and can specifically include a one-dimensional barcode, a matrix two-dimensional code, a stacked two-dimensional code, etc. encoded by using a plurality of code systems such as QR Code, Code 16K, Ultracode, or PDF417. Therefore, in the following implementations of the present specification, scanning the DOI can also be referred to as "scanning a code".

Figure 1:
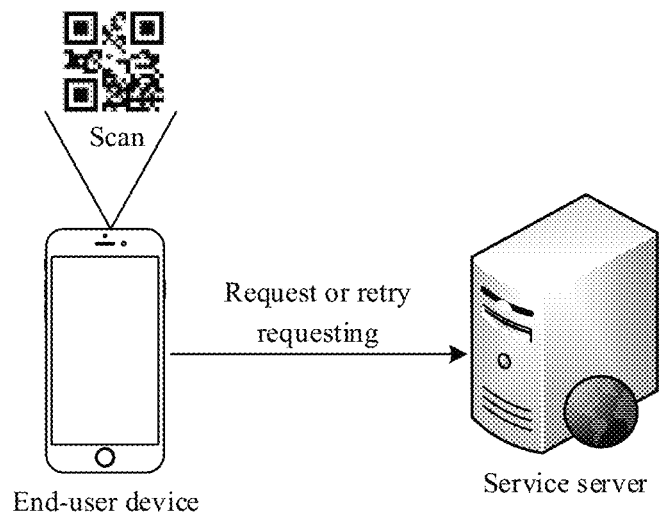
FIG. 1 is a schematic diagram illustrating an actual application scenario on which a DOI scanning-based information processing method is based, according to an implementation of the present specification.

FIG. 1 is a schematic diagram illustrating an actual application scenario on which an information processing method is based, according to an implementation of the present specification.

In FIG. 1, a user can scan a DOI by using an end-user device. The end-user device can include but is not limited to a handheld device with image collection and scanning functions such as a smartphone, a tablet computer, a mobile POS machine, or a scanning gun.

A service server in FIG. 1 is configured to process a service request sent by the end-user device after scanning. The service server usually can be a backend server of a service provider (in this scenario, the DOI can be provided by the service provider). The service provider here can include but is not limited to a merchant such as a store, a hotel, a restaurant, a coffee shop, a gas station, or a cinema or a service provider such as a telecommunications operator or a website.

In some implementations of the present specification, the service server can be alternatively a server on a service platform. In other words, services provided by various service providers are gathered on the service platform, and the user can obtain, by using the service platform, services provided by different service providers (in this scenario, the DOI can be provided by the service platform).

Certainly, the service server in FIG. 1 can use an architecture such as a single server, a cluster server, or a distributed server.

Based on the application scenario shown in FIG. 1, the following describes in detail the technical solutions provided in the implementations of the present specification.

Figure 2:
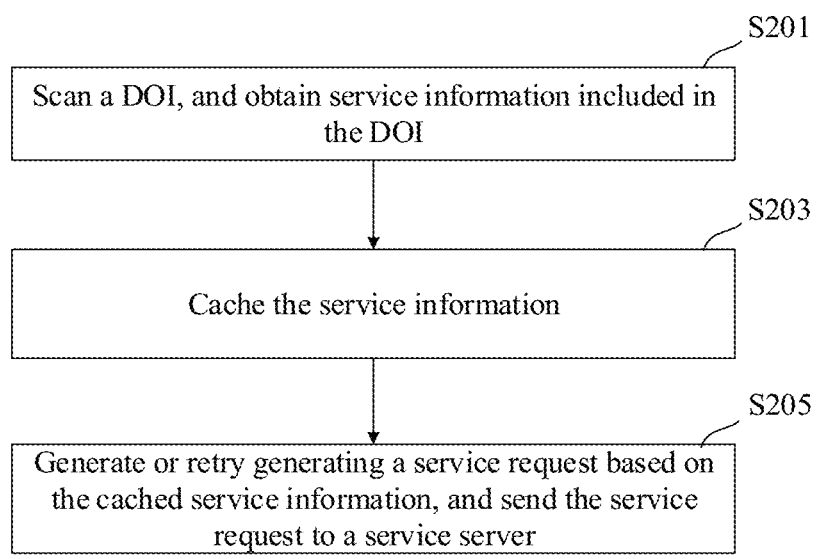
FIG. 2 is a schematic diagram illustrating a DOI scanning-based information processing process, according to an implementation of the present specification.

FIG. 2 illustrates a specific process of a DOI scanning-based information processing method, according to an implementation of the present specification. The method can include the following steps.

Step S201: Scan a DOI, and obtain service information included in the DOI.

The service information included in the DOI usually can include merchant information (for example, a merchant ID or an account name), a uniform resource locator (URL) of a service server, a product identifier, etc. After scanning an image of the DOI, an end-user device can perform corresponding decoding processing to obtain the service information in the DOI. A technology involved in the process is relatively developed, and therefore details are omitted here for simplicity.

In practice, a user usually needs to operate the end-user device by holding the end-user device, so that the end-user device can scan the corresponding DOI. In an implementation of the present implementation of the present specification, under operation by the user, the DOI can be scanned by invoking a scanning function of the end-user device by using a service application running on the end-user device. In another implementation of the present implementation of the present specification, the DOI can be scanned by using a scanning function included in an operating system of the end-user device.

Step S203: Cache the service information.

Based on an existing scanning method, if a response timeout is caused due to an abnormal network connection between the end-user device and the service server, the user needs to rescan the code by holding the end-user device. Therefore, to reduce operations of keeping holding or repeatedly holding, by the user, the end-user device to point to the DOI in the case of a response timeout as much as possible, the end-user device can cache the obtained service information in the DOI in the present implementation of the present specification. As such, the end-user device can interact with the service server based on the cached service information in a subsequent process.

In practice, the end-user device can cache the service information in a memory of the end-user device. In a feasible implementation, the end-user device can further cache the collected image of the DOI. In this case, the end-user device can cache the image of the DOI. Certainly, this constitutes no limitation on the present application here.

In some implementations, duration for caching the service information by the end-user device can be set based on an actual need. Usually, when a service result is successfully obtained from the service server or the user performs a termination operation, the end-user device can delete the cached service information. This constitutes no limitation on the present application here.

Step S205: Generate or retry generating a service request based on the cached service information, and send the service request to the service server.

After the end-user device caches the service information, the end-user device can read the cached service information. The service information can include the URL of the service server, and therefore the end-user device can further generate a corresponding service request, and send the service request to the server.

Once a response timeout is caused due to an abnormal network connection between the end-user device and the service server, the end-user device can generate a new service request based on the cached service information, and try to interact with the service server again.

In the previous steps, after the end-user device scans the DOI and obtains the service information corresponding to the DOI, the end-user device can cache the service information. Thereafter, the end-user device can read the cached service information, to generate the service request and send the service request to the service server. Particularly, when a network connection between the end-user device and the service server is abnormal, the end-user device can independently retry the service request based on the cached service information. As such, repeated scanning performed by the user by holding the end-user device can be reduced or even alleviated.

The method shown in FIG. 2 can be performed by the end-user device or a service application running on the end-user device. This constitutes no limitation on the present application here.

More specifically, in some implementations of the present specification, if a response of the service server is timed out, the end-user device can continue to retry based on the cached service information until a response of the server is obtained. To be specific, the method shown in FIG. 2 further includes: stopping retrying generating the service request when service response information fed back by the service server in response to the service request is received.

In some other implementations of the present specification, the user can actively perform an operation, so that the end-user device stops retry. To be specific, the method shown in FIG. 2 further includes: stopping retrying generating the service request when a retry stop instruction is received. The following provides detailed description by using an application scenario in which a user makes a payment by scanning a two-dimensional code by using a mobile phone.

Scenario 1

Assume that the user starts a service application installed on the mobile phone and launches a scanning interface in the service application. In this case, the user can adjust the mobile phone by using a picture that is taken by the mobile phone and displayed in the scanning interface, to point to the two-dimensional code for scanning. After performing decoding processing on the scanned two-dimensional code image, the mobile phone can obtain service information included in the two-dimensional code image, and cache the service information in the mobile phone.

Normally, the mobile phone can read the cached service information and request a service server, and display a payment page on the mobile phone based on a response of the service server, and then the user can make a payment on the payment page.

Figure 3:
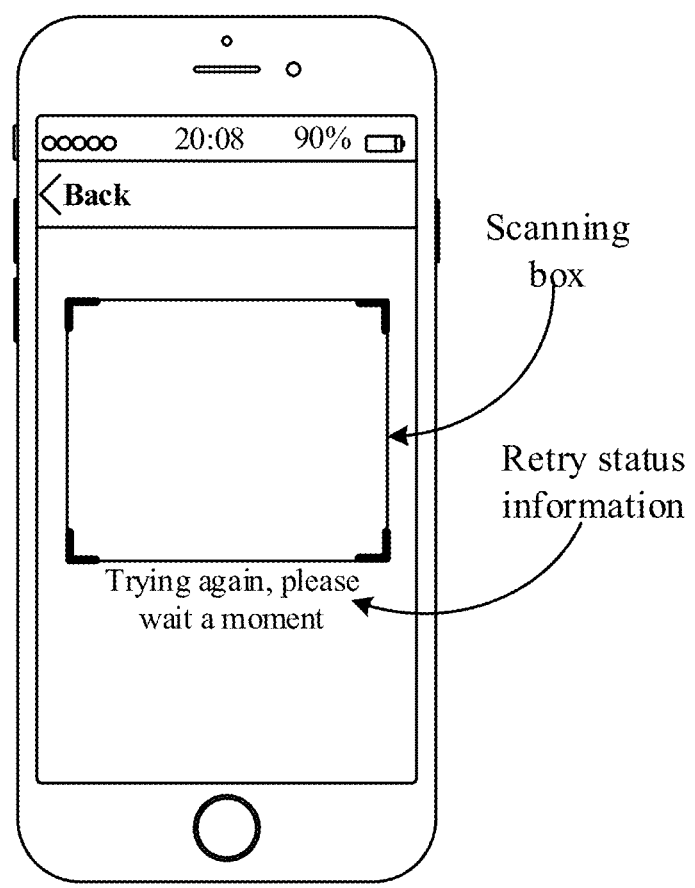
FIG. 3 and FIG. 4 are schematic diagrams illustrating an operation of stopping retry with a service server, according to an implementation of the present specification.

However, if the response of the service server is timed out or a network connection between the mobile phone and the service server is ended, the mobile phone can retry based on the cached service information. In this case, as shown in FIG. 3, retry status information (namely, "trying again" shown below a scanning box in FIG. 3) can be further displayed in the current scanning interface of the mobile phone.

In this case, if the user taps the go-back button in the upper left corner of the scanning interface (that is, exits the scanning interface), the mobile phone stops retry.

Scenario 2

Figure 4:
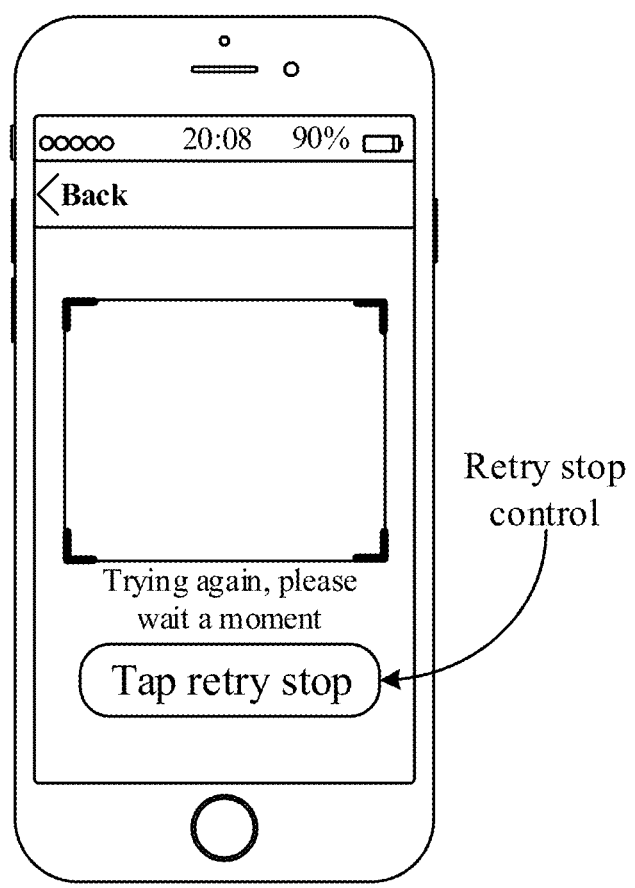

Similar to scenario 1, after scanning, retry status information is displayed in a scanning interface of the mobile phone. Further, as shown in FIG. 4, an operation control for stopping retry is further provided in the scanning interface. The user can actively perform an operation (for example, tap) on the operation control, and the mobile phone stops retry in this case.

In an implementation, in scenario 2, if the user does not use the operation control to stop retry, even if the user exits the scanning interface or returns to a home screen of the mobile phone, the mobile phone still continues to retry until a response is obtained from the service server.

Clearly, it can be seen from the previous content that a process of receiving the retry stop instruction in the method can specifically include: receiving an operation for a retry stop control displayed in a scanning interface; and generating the retry stop instruction based on the operation.

The retry stop control here can be considered as the go-back button in FIG. 3 or the operation control in FIG. 4.

In addition, in practice, the mobile phone can delete the service information cached by the mobile phone. In an implementation, the mobile phone can delete the service information when generation of the service request is stopped. In another implementation, the mobile phone does not immediately delete the cached service information, but can delete the service information after specified duration. Certainly, this is specifically set based on an actual application need, and is not specifically limited here.

Figure 5:
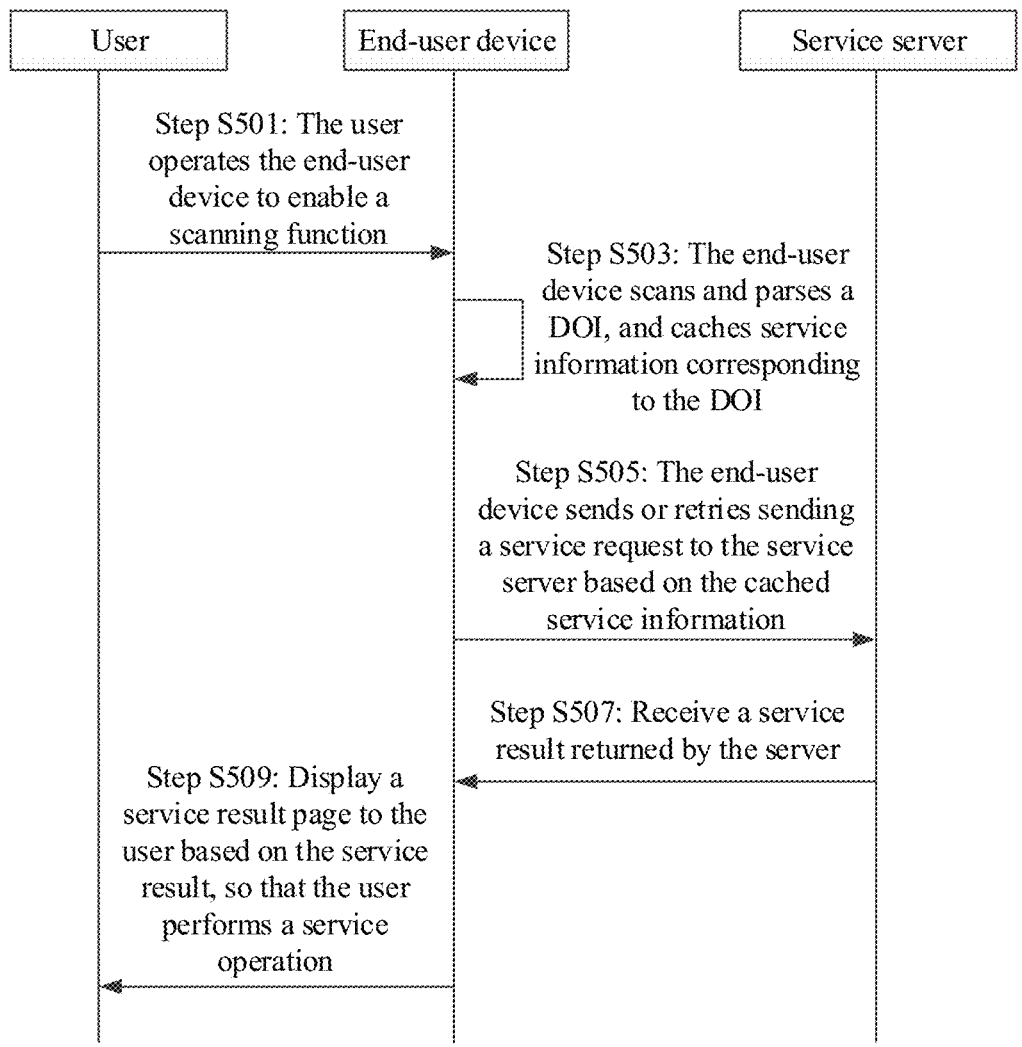
FIG. 5 illustrates a DOI scanning-based information processing procedure in an actual application scenario, according to an implementation of the present specification.

So far, an actual execution process of the previous method in the implementations of the present specification can be shown in FIG. 5, and specifically includes the following steps:

Step S501: A user operates an end-user device to enable a scanning function.

Step S503: The end-user device scans and parses a DOI, and caches service information corresponding to the DOI.

Step S505: The end-user device sends or retries sending a service request to a service server based on the cached service information.

For step S505, a retry end condition is that the service server successfully returns a response or a stop operation is received from the user.

Step S507: Receive a service result returned by the server.

Step S509: Display a service result page to the user based on the service result, so that the user performs a service operation.

It can be seen from the previous description that according to the information processing method in the implementations of the present specification, the user can scan the DOI such as a two-dimensional code by operating the end-user device, and does not need to repeatedly perform a scanning operation even if a network connection between the end-user device and the service server is abnormal. As such, it is more convenient for the user to perform scanning.

The DOI scanning-based information processing method provided in the implementations of the present specification is described above. Based on the same concept, the implementations of the present specification further provide a corresponding DOI scanning-based information processing apparatus.

Figure 6:
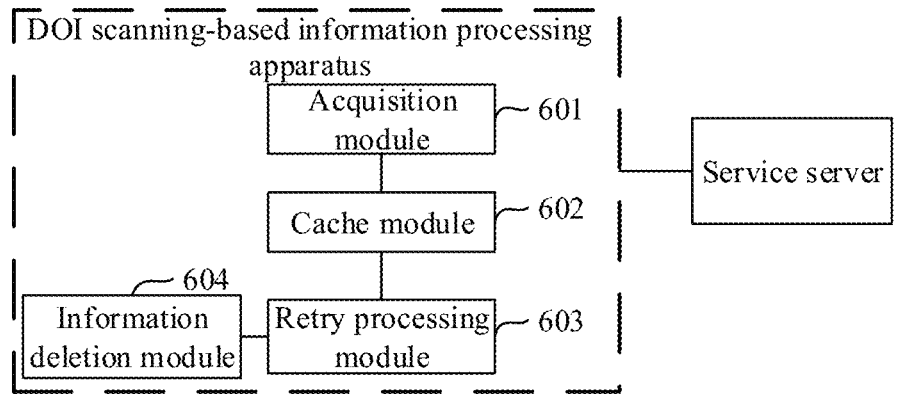
FIG. 6 is a schematic structural diagram of a DOI scanning-based information processing apparatus, according to an implementation of the present specification.

Specifically, the DOI scanning-based information processing apparatus provided in the implementations of the present specification is shown in FIG. 6. The apparatus includes: an acquisition module 601, configured to scan a DOI, and obtain service information included in the DOI; a cache module 602, configured to cache the service information; and a retry processing module 603, configured to generate or retry generating a service request based on the cached service information, and send the service request to a service server.

Further, the retry processing module 603 is configured to stop retrying generating the service request when service response information fed back by the service server in response to the service request is received.

The retry processing module 603 is configured to stop retrying generating the service request when a retry stop instruction is received.

The retry processing module 603 is configured to receive an operation for a retry stop control displayed in a scanning interface, and generate the retry stop instruction based on the operation.

The apparatus further includes an information deletion module 604, configured to delete the service information when generation of the service request is stopped, or delete the service information after predetermined cache duration.

In practice, the apparatus shown in FIG. 6 can be implemented by a physical device (for example, an end-user device). Specifically, the device includes a processor and a memory.

The memory is configured to store a DOI scanning-based information processing program.

The processor is configured to invoke the DOI scanning-based information processing program stored in the memory, and perform the following operations: scanning a DOI, and obtaining service information included in the DOI;

caching the service information; and generating or retrying generating a service request based on the cached service information, and sending the service request to a service server.

In addition, the implementations of the present specification further provide a storage medium that can implement the previous DOI scanning-based information processing, and the storage medium is configured to perform the following method: scanning a DOI, and obtaining service information included in the DOI; caching the service information; and generating or retrying generating a service request based on the cached service information, and sending the service request to a service server.

The implementations of the present specification are described in a progressive way. For the same or similar parts of the implementations, references can be made to the implementations. Each implementation focuses on a difference from other implementations. The apparatus, device, and medium implementations are similar to the method implementation, and therefore are briefly described. For related parts, references can be made to partial description of the method implementation. Details are omitted here for simplicity.

So far, the specific implementations of the present application have been described. Other implementations fall within the scope of the appended claims. In some cases, the actions described in the claims can be performed in a different order and the desired results can still be achieved. In addition, the process depicted in the accompanying drawings does not necessarily require a particular order to achieve the desired results. In some implementations, multitask processing and parallel processing can be advantageous.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present application is implemented, functions of units can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The implementations of the present specification are described in a progressive way. For the same or similar parts of the implementations, references can be made to the implementations. Each implementation focuses on a difference from other implementations. In particular, the system implementation is basically similar to the method implementation, and therefore is briefly described. For related parts, references can be made to partial description of the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
scanning, by a user device, a digital object identifier (DOI);
based on scanning the DOI, obtaining, by the user device, service information encoded in the DOI;
caching, by the user device, the service information within memory of the user device;
generating, by the user device, a first service request based on the service information cached within the memory of the user device;
sending, by the user device, the first service request to a service server;
determining, by the user device, non-receipt of a service response from the service server within a predetermined time duration following the sending of the first service request;
in response to determining the non-receipt of the service response from the service server within the predetermined time duration, generating, by the user device, a second service request based on the service information cached within the memory of the user device;
sending, by the user device, the second service request to the service server;

providing, by the user device, a scanning user interface configured to display a retry stop control after sending the second service request to the service server;

receiving user-input indicative of an operation for the retry stop control displayed in the scanning user interface; and in response to receiving the user-input indicative of the operation for the retry stop control, (i) preventing, by the user device, generation of a third service request and (ii) deleting, by the user device, the service information cached within the memory of the user device.

2. The computer-implemented method of claim 1, further comprising:

receiving the service response from the service server; and based on receiving the service response from the service server, preventing generation of the third service request.

3. The computer-implemented method of claim 2, further comprising:

deleting the service information responsive to receiving the service response from the service server.

4. The computer-implemented method of claim 1, further comprising:

deleting the service information after a predetermined cache duration.

5. The computer-implemented method of claim 1, wherein generating the second service request comprises referencing the service information cached within the memory of the user device without additional scanning by the user device.

6. A non-transitory, computer-readable medium storing one or more instructions executable by a computer system to perform operations comprising:

scanning, by a user device, a digital object identifier (DOI);

based on scanning the DOI, obtaining, by the user device, service information encoded in the DOI;

caching, by the user device, the service information within memory of the user device;

generating, by the user device, a first service request based on the service information cached within the memory of the user device;

sending, by the user device, the first service request to a service server;

determining, by the user device, non-receipt of a service response from the service server within a predetermined time duration following the sending of the first service request;

in response to determining the non-receipt of the service response from the service server within the predetermined time duration, generating, by the user device, a second service request based on the service information cached within the memory of the user device;

sending, by the user device, the second service request to the service server;

providing, by the user device, a scanning user interface configured to display a retry stop control after sending the second service request to the service server;

receiving user-input indicative of an operation for the retry stop control displayed in the scanning user interface; and in response to receiving the user-input indicative of the operation for the retry stop control, (i) preventing, by the user device, generation of a third service request and (ii) deleting, by the user device, the service information cached within the memory of the user device.

7. The non-transitory, computer-readable medium of claim 6, further comprising:

receiving the service response from the service server; and based on receiving the service response from the service server, preventing generation of the third service request.

8. The non-transitory, computer-readable medium of claim 7, further comprising:

deleting the service information responsive to receiving the service response from the service server.

9. The non-transitory, computer-readable medium of claim 6, further comprising:

deleting the service information after a predetermined cache duration.

10. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

scanning, by a user device, a digital object identifier (DOI);

based on scanning the DOI, obtaining, by the user device, service information encoded in the DOI;

caching, by the user device, the service information within memory of the user device;

generating, by the user device, a first service request based on the service information cached within the memory of the user device;

sending, by the user device, the first service request to a service server;

determining, by the user device, non-receipt of a service response from the service server within a predetermined time duration following the sending of the first service request;

in response to determining the non-receipt of the service response from the service server within the predetermined time duration, generating, by the user device, a second service request based on the service information cached within the memory of the user device;

sending, by the user device, the second service request to the service server;

providing, by the user device, a scanning user interface configured to display a retry stop control after sending the second service request to the service server;

receiving user-input indicative of an operation for the retry stop control displayed in the scanning user interface; and in response to receiving the user-input indicative of the operation for the retry stop control, (i) preventing, by the user device, generation of a third service request and (ii) deleting, by the user device, the service information cached within the memory of the user device.

11. The computer-implemented system of claim 10, further comprising:

receiving the service response from the service server; and based on receiving the service response from the service server, preventing generation of the third service request.

12. The computer-implemented system of claim 11, further comprising:

deleting the service information responsive to receiving the service response from the service server.

13. The computer-implemented system of claim 10, further comprising:
 deleting the service information after a predetermined cache duration.

* * * * *